Dec. 22, 1953
F. A. LICCIARDELLO
2,663,227
NOZZLE ADAPTER SEAT REFACING DEVICE
Filed Aug. 9, 1951
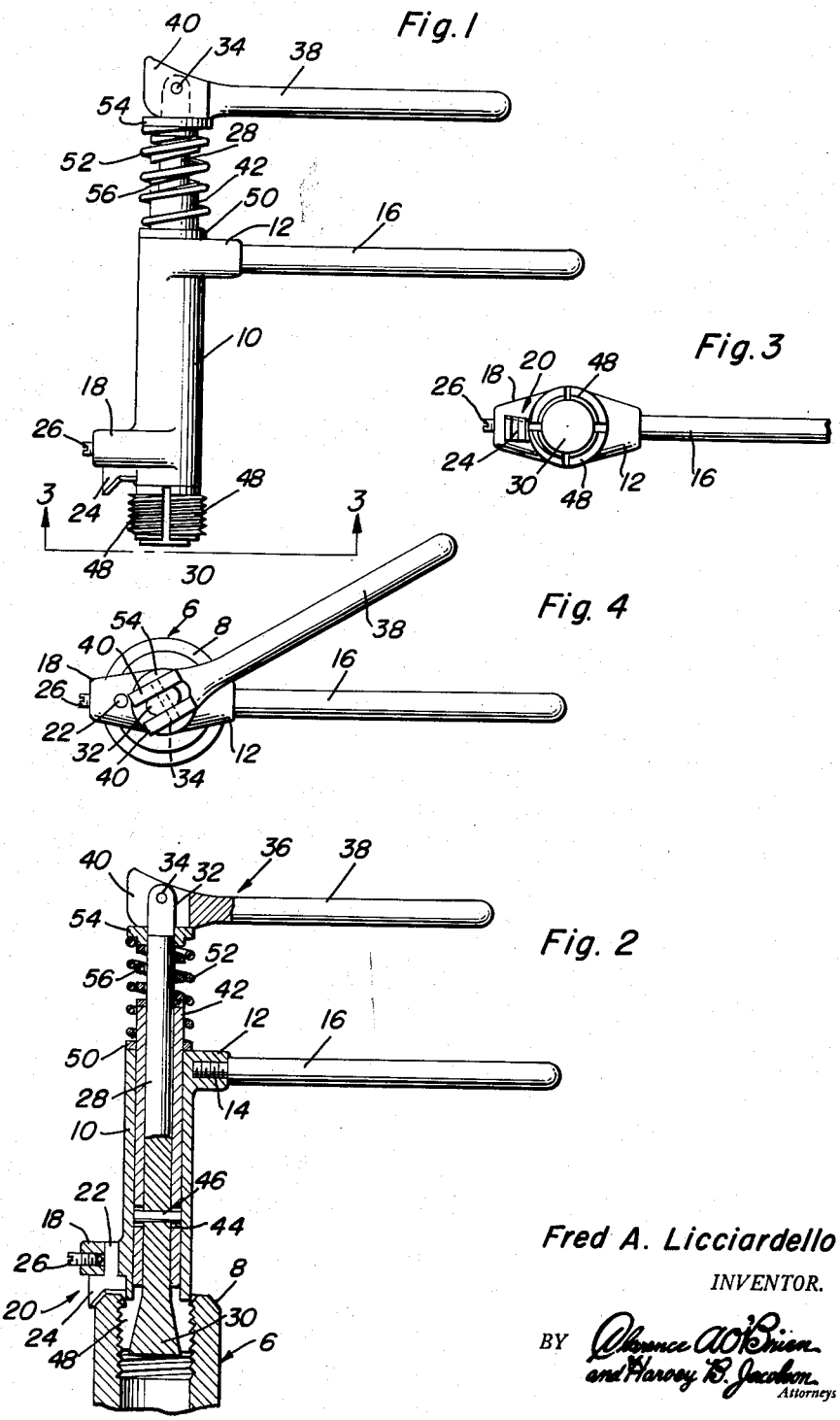
Fred A. Licciardello
INVENTOR.

Patented Dec. 22, 1953

2,663,227

UNITED STATES PATENT OFFICE 2,663,227

NOZZLE ADAPTER SEAT REFACING DEVICE

Fred A. Licciardello, North Andover, Mass.

Application August 9, 1951, Serial No. 241,133

3 Claims. (Cl. 90—12)

The present invention relates to certain new and useful improvements in special implements and devices expressly devised for use by mechanics and repairmen who are called upon to adjust and otherwise perform work on gun-type oil burners and has more particular reference to a nozzle adapter seat renewing and refacing device.

It is a matter of common knowledge that a leaky nozzle adapter permits carbonizing of the electrodes and sooner or later renders the latter ineffective. In the majority of oil burner constructions the required nozzle is screwed into an adapter, the latter being an internally screw threaded nipple or union having a bevelled seat at the nozzle end for coaction with the nozzle. The seat wears and becomes faulty and results in annoying leakage of oil. A serviceman finding this to be the difficulty, when called upon for aid, may have to make a trip back to the shop to obtain a new adapter to replace the leaky one. Conditions such as these involve an expenditure of time and labor and there has long existed a need for a handy implement whereby a serviceman may simply regrind the seat and thus restore it to its original satisfactorily performing condition. Therefore, the object of the present invention is to provide a simple, practical and economical nozzle adapter seat renewing device which may be handily employed and in which manufacturers and servicemen will find their respective requirements and needs fully met and effectually available.

Briefly summarized, the device under advisement is characterized by a cylindrical sleeve having a lateral handle at one end and a readily attachable and detachable seat grinding and cutting tool at the opposite end. Means extends axially through the sleeve and provides a journal on which the sleeve rotates, said means being provided at its inner end with a chuck-like clamp which screws into the adapter. End thrust means is provided at the upper end of the first named means, whereby to resiliently press the grinding or cutting tool into proper coacting relation in respect to the defective seat on the adapter.

It is an object of the invention to thus provide a device which screws into the nozzle adapter and, by way of the expansible chuck, anchors itself securely to the adapter and, in this manner, to provide the desired journalling mount for the tool-equipped rotary sleeve.

It is a further object of the invention to utilize a simple locking bolt and an associated cam pivoted on the bolt and end thrust means interposed between the cam and including a coil spring which exerts resilient pressure against the stated sleeve and provides satisfactory coaction between the tool and the adapter seat.

A still further object of the invention has to do with a unique arrangement of inner and outer concentric coil springs embodied in the end thrust means wherein the inner spring resiliently retains the spring compressing cam lever in its respective off and on positions.

Other objects and advantages will become more readily apparent from the following description and the accompanying sheet of illustrative drawings.

In the accompanying sheet of drawings, wherein like numerals are employed to designate like parts throughout the views:

Figure 1 is a side elevation of a nozzle adapter seat renewing and refacing device constructed in accordance with the principles of the present invention;

Figure 2 is a view of the same with parts in section and elevation and showing the manner in which said device is coupled and clamped on the adapter;

Figure 3 is a bottom or end elevation of the device appearing in Figure 1, taken on the line 3—3 and looking in the direction of the arrows; and Figure 4 is a top plan view of the structure seen in Figure 1 showing the cam lever and sleeve handle out of alignment with each other.

Referring now to the drawings and primarily to the assembly and operating view identified as Figure 2, the numeral 6 designates a fragmentary portion of a nozzle adapter fitting which is in the form of a union and which is internally screw-threaded at opposite ends but is known in the burner trade as a nozzle adapter. The beveled annular seat, which is the primary factor under consideration, is denoted by the numeral 8. As before stated, constant coaction between this seat and a mating surface on the oil nozzle (not shown), results in the seat becoming irregular and faulty. What with leakages occurring as a result of a faulty coaction of parts, it is necessary to either regrind or reface the seat or to replace the adapter. The instrumentality herein disclosed is intended as a ready and practical means for refacing service.

It seems simpler to start with the rotary sleeve. This is denoted by the numeral 10 and is of cylindrical cross-section and provided at one end with an integral lateral boss which is internally screw threaded and therefore provides a screw-threaded socket member 12 which accommodates the shank 14 on the attachable and detachable sleeve turning handle 16. There is a similar projection or boss at the opposite end of the sleeve and this is denoted by the numeral 18 and is made to serve as a holder for the grinding and resurfacing tool 20. Said holder has opening means to accommodate the shank 22 and to properly position the blade means 24 which cooperates with the seat 8. A simple setscrew 26 is carried by the holder and engages the shank and holds the tool in place.

The means which is employed for axially securing the sleeve in operating position and which also serves as a journal for rotating the sleeve is a simple assembly. This assembly is characterized by a locking bolt 28 having a conical expander head 30 at one end. Pivoted to the opposite end 32 as at the point 34 is a cam device 36. This comprises a lever 38 having a bifurcated end, the furcations 40 constituting cams. These cams may be collectively referred to as "cam means." In other words, cam means is pivoted on one end of the locking bolt and operated by a handle or lever 38. The locking bolt is axially fitted slidably but non-rotatably in a bushing 42. The bushing has diametrically opposite slots 44 and there is a pin 46 carried by the bolt and extending, at its ends, into the slots. This serves to slidably key the bolt and bushing together. The lower end of the bushing, that is, lower in the drawings, has externally screw-threaded resilient grips or jaws 48 and these screw into the screw-threads into the adapter in the manner shown. These circumferentially spaced, expansible and contractible grips in conjunction with the expander 30 define what may be conveniently referred to as a chuck-like clamp. The latter is screwed into the adapter and then the expander is operated to bind the grips securely and, in this manner, to lock the bolt and bushing to the adapter. Since the sleeve 10 surrounds the bushing, the bushing and bolt constitute journal means on which the sleeve turns. The numeral 50 designates a washer bearing against the sleeve and accommodating one end of an outer coil spring 52. This coil spring bears at its opposite end against the collar 54 which is fitted on the bolt and has end thrust contact with the cam elements 40. This thrust spring 52 exerts the necessary expansion force against the sleeve and thus presses the cutting tool yieldably against the seat 8 in an obvious manner. There is a second or inner coil spring 56 and this surrounds the bolt and is preferably a spring made up of square coils. This spring 56 bears, at its upper end, against the collar 54 and at its lower end against the bushing in the manner shown.

In operation, the chuck means is screwed into the adapter as shown in Figure 2 and the chuck is tightened and thus clamped securely in place. This is accomplished by way of the cam means, lever and end thrust means interposed between the cam means and bushing, as is obvious. As stated, the spring 52 forces the sleeve and tool into working position and once the bushing is clamped in place, the sleeve may be turned around it by way of the handle 16 in an obvious manner for resurfacing the seat 8.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. For use with a nozzle adapter having a nozzle seat, a refacing device for said seat comprising a bushing, having expansible and contractible externally screw-threaded grips at one end, a locking bolt slidably but non-rotatably keyed in said bushing, said bolt being of a length greater than the length of the bushing and having a conical expander at one end cooperating with said grips, a sleeve externally surrounding and rotatable on said bushing and provided with handle means and seat refacing tool means, a cam pivoted on the other end of said bolt, a lever fixed to said cam for operating said cam, and end thrust means interposed between said cam and the adjacent end of said sleeve.

2. The structure defined in claim 1, said end thrust means embodying a first coil spring surrounding said bolt and bearing at one end against said bushing, and a second coil spring encircling said first spring and bearing at one end against said sleeve.

3. For use with a nozzle adapter having a nozzle seat and wherein said adapter is internally screw-threaded; a refacing device for said seat comprising a bushing having expansible and contractible externally screw-threaded grips at one end adapted to be screwed into the internal screw threads in said adapter in a manner to render the bushing in axial alinement with the adapter, a sleeve externally surrounding and rotatable on said bushing, one end of said sleeve having rotatable contact with said grips and being provided with an accessible externally arranged resurfacing tool, adapted to engage the seat for reconditioning the seat, the other end of said sleeve terminating inwardly of the corresponding end of said bushing, a handle carried by said other end, a bolt slidably but non-rotatably keyed in the bore of said bushing, said bolt being of a length greater than the length of the bushing and having a conical expander at one end cooperating with said grips, the other end of said bolt projecting outwardly beyond the corresponding ends of the sleeve and bushing, cam means pivotally mounted on said other end of said bolt and provided with an operating lever, a first coil spring surrounding the projecting end of the bolt and bearing at one end against the bushing, and cooperating at its opposite end with said cam means, a second coil spring encircling the first spring and bearing at one end against said sleeve and having its opposite end cooperating with said cam means.

FRED A. LICCIARDELLO.

References Cited in the file of this patent

UNITED STATES PATENTS

| Number | Name | Date |
| --- | --- | --- |
| 2,032,384 | West | Mar. 3, 1936 |